US007585392B2

(12) United States Patent
Kokko et al.

(10) Patent No.: US 7,585,392 B2
(45) Date of Patent: Sep. 8, 2009

(54) METHOD OF PRODUCING ABSORBENT SHEET WITH INCREASED WET/DRY CD TENSILE RATIO

(75) Inventors: Bruce J. Kokko, Neenah, WI (US); Steven L. Edwards, Fremont, WI (US)

(73) Assignee: Georgia-Pacific Consumer Products LP, Atlanta, GA (US)

(*) Notice: Subject to any disclaimer, the term of this patent is extended or adjusted under 35 U.S.C. 154(b) by 0 days.

(21) Appl. No.: 11/867,113

(22) Filed: Oct. 4, 2007

(65) Prior Publication Data

US 2008/0083519 A1    Apr. 10, 2008

Related U.S. Application Data

(60) Provisional application No. 60/850,681, filed on Oct. 10, 2006.

(51) Int. Cl.
*D21H 23/04* (2006.01)
*D21H 21/20* (2006.01)
*D21H 21/22* (2006.01)
*B31F 1/12* (2006.01)

(52) U.S. Cl. .................. 162/183; 162/111; 162/158; 162/147; 162/179

(58) Field of Classification Search .............. 162/109, 162/111–113, 183, 185, 158, 164.1, 168.1, 162/179, 141, 149, 147
See application file for complete search history.

(56) References Cited

U.S. PATENT DOCUMENTS

| | | | | |
|---|---|---|---|---|
| 2,944,931 A * | 7/1960 | Yang | ............................ | 162/179 |
| 3,151,017 A * | 9/1964 | Brafford | ...................... | 162/141 |
| 3,432,936 A | 3/1969 | Cole et al. | ......................... | 34/6 |
| 3,556,932 A | 1/1971 | Coscia et al. | ................ | 162/166 |
| 3,556,933 A | 1/1971 | Williams et al. | ............. | 162/167 |
| 3,700,623 A | 10/1972 | Keim | ..................... | 260/80.3 R |
| 3,772,076 A | 11/1973 | Keim | ............................ | 162/164.3 |
| 3,844,880 A * | 10/1974 | Meisel et al. | ................ | 162/169 |
| 3,974,025 A | 8/1976 | Ayers | ........................ | 162/113 |
| 4,125,659 A * | 11/1978 | Klowak et al. | ............... | 428/153 |
| 4,144,122 A * | 3/1979 | Emanuelsson et al. | ...... | 162/158 |
| 4,239,065 A | 12/1980 | Trokhan | ............... | 139/383 AA |
| 4,441,962 A | 4/1984 | Osborn, III | ................. | 162/111 |
| 4,447,294 A * | 5/1984 | Osborn, III | ................. | 162/158 |
| 4,448,638 A * | 5/1984 | Klowak | ........................ | 162/112 |
| 4,482,429 A * | 11/1984 | Klowak | ........................ | 162/111 |
| 4,490,925 A | 1/1985 | Smith | ............................. | 34/42 |
| 4,507,173 A * | 3/1985 | Klowak et al. | ............... | 162/112 |
| 4,529,480 A | 7/1985 | Trokhan | ...................... | 162/109 |
| 4,533,437 A | 8/1985 | Curran et al. | ................ | 162/281 |
| 4,610,743 A * | 9/1986 | Salmeen et al. | ............. | 156/183 |
| 4,720,383 A | 1/1988 | Drach et al. | .................. | 424/70 |
| 4,834,838 A * | 5/1989 | Klowak | ........................ | 162/109 |
| 4,849,054 A * | 7/1989 | Klowak | ........................ | 162/109 |
| 4,940,513 A * | 7/1990 | Spendel | ....................... | 162/112 |
| 5,223,096 A | 6/1993 | Phan et al. | .................. | 162/158 |
| 5,262,007 A | 11/1993 | Phan et al. | .................. | 162/158 |
| 5,264,082 A | 11/1993 | Phan et al. | .................. | 162/158 |
| 5,279,767 A * | 1/1994 | Phan et al. | ..................... | 516/59 |
| 5,312,522 A | 5/1994 | Phan et al. | .................. | 162/111 |
| 5,415,737 A | 5/1995 | Phan et al. | .................. | 162/111 |
| 5,449,026 A | 9/1995 | Lee | ........................ | 139/383 A |
| 5,501,768 A | 3/1996 | Hermans et al. | ............... | 162/9 |
| 5,573,637 A * | 11/1996 | Ampulski et al. | ........... | 162/112 |
| 5,607,551 A | 3/1997 | Farrington, Jr. et al. | ..... | 162/109 |
| 5,690,149 A | 11/1997 | Lee | ........................ | 139/383 A |
| 5,690,790 A * | 11/1997 | Headlam et al. | ............. | 162/175 |
| 5,785,813 A | 7/1998 | Smith et al. | .................. | 162/158 |
| 5,851,353 A | 12/1998 | Fiscus et al. | ................. | 162/113 |
| 5,865,955 A | 2/1999 | Ilvespaaet et al. | ........... | 162/207 |
| 5,935,383 A | 8/1999 | Sun et al. | ..................... | 162/158 |
| 5,968,590 A | 10/1999 | Ahonen et al. | .............. | 427/209 |
| 6,001,218 A | 12/1999 | Hsu et al. | ....................... | 162/5 |
| 6,001,421 A | 12/1999 | Ahonen et al. | .............. | 427/316 |
| 6,033,523 A * | 3/2000 | Dwiggins et al. | ........... | 162/111 |
| 6,059,928 A | 5/2000 | Van Luu et al. | ............. | 162/111 |
| 6,074,527 A | 6/2000 | Hsu et al. | .................... | 162/111 |
| 6,119,362 A | 9/2000 | Sundqvist et al. | .............. | 34/120 |
| 6,146,494 A | 11/2000 | Seger et al. | ..................... | 162/9 |
| 6,149,769 A * | 11/2000 | Mohammadi et al. | ........ | 162/111 |

(Continued)

FOREIGN PATENT DOCUMENTS

| | | | |
|---|---|---|---|
| EP | 279465 A2 * | 8/1988 | |
| EP | 485360 A2 * | 5/1992 | |
| WO | WO 0202869 A2 * | 1/2002 | |

OTHER PUBLICATIONS

Chapter 2: Alkaline-Curing Polymeric Amine-Epichlorhydrin by Espy in Wet Strength Resins and Their Application (L. Chan, Editor, 1994); Trivedi et al., J. Am. Oil Chemist's Soc., Jun. 1981, pp. 754-756; Westfelt in Cellulose Chemistry and Technology, vol. 13, p. 813, 1979.
Egan, J.Am. Oil Chemist's Soc., vol. 55 (1978), pp. 118-121; and Evans, Chemistry and Industry, Jul. 5, 1969, pp. 893-903.
U.S. Appl. No. 11/804,246, filed May 16, 2007, Edwards et al.
U.S. Appl. No. 11/678,669, filed Feb. 26, 2007, Chou et al.
U.S. Appl. No. 60/903,789, filed Feb. 27, 2007, Chou et al.
U.S. Appl. No. 60/881,310, filed Jan. 19, 2007, Sumnicht.

*Primary Examiner*—José A Fortuna
(74) *Attorney, Agent, or Firm*—Michael W. Ferrell

(57) ABSTRACT

A method of making absorbent cellulosic sheet with increased wet/dry CD tensile ratio includes treating the fiber at high consistency with debonder in a pulper, for example. The process enables the use of large amounts of debonder in a wet-press process in order to achieve wet/dry CD tensile ratios of greater than 30%.

18 Claims, 7 Drawing Sheets

U.S. PATENT DOCUMENTS

| | | |
|---|---|---|
| 6,245,197 B1 | 6/2001 | Oriaran et al. ............... 162/112 |
| 6,273,995 B1 | 8/2001 | Ikeda et al. ................. 162/111 |
| 6,344,109 B1 | 2/2002 | Gross ......................... 162/100 |
| 6,432,267 B1 | 8/2002 | Watson ....................... 162/111 |
| 6,461,476 B1 | 10/2002 | Goulet et al. ............... 162/158 |
| 6,497,789 B1 | 12/2002 | Hermans et al. ........... 162/205 |
| 6,558,511 B2* | 5/2003 | Dwiggins et al. ........... 162/112 |
| 6,582,560 B2 | 6/2003 | Runge et al. ............... 162/182 |
| 6,818,101 B2* | 11/2004 | Vinson et al. ............... 162/158 |
| 6,855,229 B2* | 2/2005 | McKay et al. .............. 162/179 |
| 6,969,443 B1 | 11/2005 | Kokko .......................... 162/5 |
| 7,041,197 B2 | 5/2006 | Kokko et al. ............... 162/167 |
| 7,229,528 B2* | 6/2007 | Vinson et al. ............... 162/111 |
| 7,399,378 B2* | 7/2008 | Edwards et al. ............ 162/111 |
| 7,416,637 B2* | 8/2008 | Murray et al. .............. 162/111 |
| 2002/0074097 A1 | 6/2002 | Gross ......................... 162/158 |
| 2002/0088577 A1 | 7/2002 | Watson et al. .............. 162/109 |
| 2002/0104630 A1* | 8/2002 | Dwiggins et al. ........... 162/123 |
| 2002/0162635 A1 | 11/2002 | Hsu et al. ..................... 162/55 |
| 2003/0024669 A1 | 2/2003 | Kokko ..................... 162/164.3 |
| 2003/0136531 A1* | 7/2003 | Edwards et al. ............ 162/111 |
| 2003/0159786 A1 | 8/2003 | Runge et al. ............... 162/109 |
| 2004/0045687 A1 | 3/2004 | Shannon et al. ............. 162/158 |
| 2004/0123962 A1 | 7/2004 | Shannon et al. ................. 162/9 |
| 2004/0168780 A1* | 9/2004 | Dwiggins et al. ........... 162/125 |
| 2004/0238135 A1 | 12/2004 | Edwards et al. ............ 162/111 |
| 2005/0103455 A1* | 5/2005 | Edwards et al. ............ 162/111 |
| 2005/0133176 A1* | 6/2005 | Vinson et al. ............... 162/111 |
| 2005/0217814 A1 | 10/2005 | Super et al. ................. 162/111 |
| 2005/0241786 A1 | 11/2005 | Edwards et al. ............ 162/109 |
| 2005/0241787 A1 | 11/2005 | Murray et al. .............. 162/113 |
| 2005/0279471 A1 | 12/2005 | Murray et al. .............. 162/111 |
| 2006/0000567 A1 | 1/2006 | Murray et al. .............. 162/111 |
| 2006/0118993 A1* | 6/2006 | Awofeso et al. ............ 264/156 |
| 2006/0124261 A1* | 6/2006 | Lindsay et al. ............. 162/117 |
| 2006/0237154 A1 | 10/2006 | Edwards et al. ............ 162/111 |
| 2006/0289133 A1 | 12/2006 | Yeh et al. .................... 162/109 |
| 2006/0289134 A1 | 12/2006 | Yeh et al. .................... 162/111 |
| 2007/0062656 A1 | 3/2007 | Murray et al. .............. 162/111 |
| 2007/0131366 A1* | 6/2007 | Underhill et al. ........... 162/109 |
| 2007/0251656 A1* | 11/2007 | Vinson et al. ............... 162/111 |
| 2008/0008860 A1* | 1/2008 | Murray et al. .............. 428/152 |
| 2008/0029235 A1* | 2/2008 | Edwards et al. ............ 162/111 |
| 2008/0047675 A1* | 2/2008 | Murray et al. .............. 162/101 |
| 2008/0083519 A1* | 4/2008 | Kokko et al. ................... 162/9 |

* cited by examiner

UNREFINED/PULPER ADDITION

FIG. 2
THICK STOCK ADDITIONS
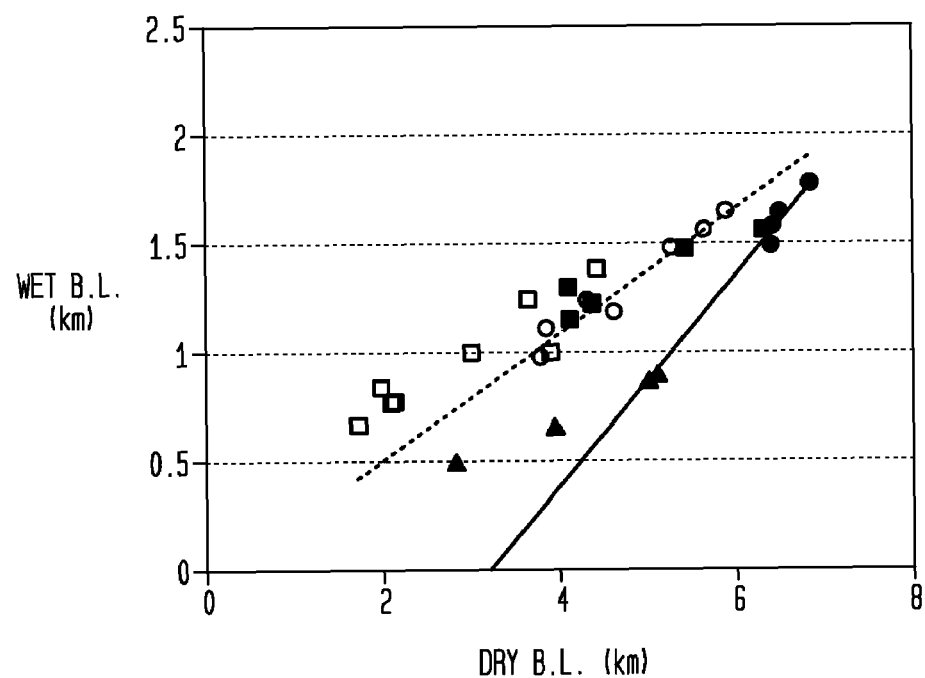
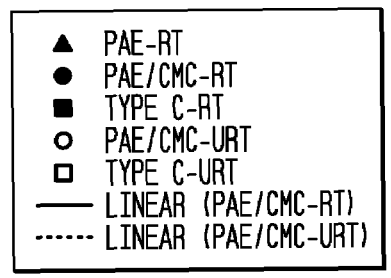
▲ PAE-RT
● PAE/CMC-RT
■ TYPE C-RT
○ PAE/CMC-URT
□ TYPE C-URT
—— LINEAR (PAE/CMC-RT)
----- LINEAR (PAE/CMC-URT)

COMPARISON OF TYPE C SCENARIOS

METHOD OF PRODUCING ABSORBENT SHEET WITH INCREASED WET/DRY CD TENSILE RATIO

CLAIM FOR PRIORITY

This non-provisional patent application is based upon U.S. Provisional Patent Application Ser. No. 60/850,681, of the same title, filed Oct. 10, 2006, the priority of which is hereby claimed and the disclosure of which is hereby incorporated herein by reference.

TECHNICAL FIELD

The present invention relates to absorbent sheet of the class used to make paper towel. In particular, the present invention relates to a method of making such products with high relative CD wet tensile including, in one embodiment, treating softwood Kraft papermaking fiber with a debonder at consistencies of greater than 2 percent and subsequently adding a wet strength resin. Especially preferred products have wet/dry CD tensile ratios of greater than 30 percent, as well as MD/CD dry tensile ratios of less than 1.

BACKGROUND

The dry strength of a paper towel or tissue is often dictated by the required wet strength of the product in-use. In particular, the MD dry tensile may be higher than needed in order to provide sufficient CD wet strength which, as one of skill in the art will appreciate adversely affects softness of the towel. One approach to ameliorating the softness/wet strength conflict is through the use of wet strength resins, in combinations, for example, such as a cationic wet strength resin and a hydrophobically modified anionic polyelectrolyte. See U.S. Pat. No. 7,041,197 to Kokko et al.

The CD wet/dry ratio tensile is a convenient parameter by which to characterize absorbent paper products, it being noted that higher wet/dry CD tensile ratios are desirable, for example, in order to provide for softer paper toweling. It has been disclosed in U.S. Pat. No. 6,461,476 to Goulet et al. that the wet/dry tensile of throughdried tissue and towels can be increased by treating the pulp with a debonder, a wet strength agent and a dry strength agent.

Chemical debonders, also referred to as softeners, are frequently employed in the manufacture of paper tissue and towel. One preferred debonder composition includes a softener system comprising an ion-paired mixture of an anionic surfactant and a cationic quaternary ammonium compound. Details are seen in U.S. Pat. No. 6,245,197 to Oriaran et al. Typically, debonders are added to the papermaking furnish at relatively low fiber consistencies, such as are seen in a stock chest or a machine chest. In this regard, see U.S. Pat. No. 5,785,813 to Smith et al.; note FIG. 1 thereof wherein hardwood fiber is treated with debonder. Note also, U.S. Pat. No. 5,501,768 to Hermans et al., Example 9, Col. 13 wherein kraft hardwood fiber is treated with debonder in a shaft disperser.

The following patents also disclose papermaking processes wherein a debonder composition is added after the fiber has been pulped: U.S. Pat. No. 6,273,995 to Ikeda et al.; U.S. Pat. No. 6,146,494 to Seger et al.; and U.S. Pat. No. 4,441,962 to Osborn, III.

It has been suggested to pre-treat high yield fiber with a combination of oil and surfactant, prior to making absorbent sheet. In this regard reference is made to U.S. Pat. No. 6,001,218 to Hsu et al. and U.S. Pat. No. 6,074,527, also to Hsu et al. According to the '218 and '527 patents, a pulp slurry is treated at elevated temperature with oil and surfactant in order to produce softer products.

It will be appreciated by one of skill in the art that the prior art is replete with pulp treatments seeking to provide a softer and/or stronger product. In this regard, the following references are noted generally: United States Patent Publication No. 2003/0024669 (U.S. Ser. No. 09/852,997) entitled "Use of Hydrophobically Modified Polyaminamides With Polyethylene Glycol Esters in Paper Products" of Kokko; United States Patent Publication No. 2002/0162635 (U.S. Ser. No. 10/143,674) entitled "Softer and Higher Strength Paper Products and Methods of Making Such Products" of Hsu; United States Patent Publication No. 2002/0088575 (U.S. Ser. No. 09/942,468) entitled "Enzymatic Treatment of Pulp to Increase Strength" of Lonsky et al.; United States Patent Publication No. 2004/0123962 (U.S. Ser. No. 10/335,133) entitled "Amino-Functionalized Pulp Fibers" of Shannon et al.; U.S. Pat. No. 6,582,560 entitled "Method for Using Water Insoluble Chemical Additives with Pulp and Products Made By Said Method" to Runge et al. See also United States Patent Publication No. 2003/0159786 (U.S. Ser. No. 10/389,073) entitled "Method For Using Water Insoluble Chemical Additives with Pulp and Products Made by Said Method" of Runge et al.; United States Patent Publication No. 2004/0045687 (U.S. Ser. No. 10/242,571) entitled "Method for Using Water Insoluble Chemical Additives With Pulp and Products Made by Said Method" of Shannon et al.; U.S. Pat. No. 6,344,109 entitled "Softened Comminution Pulp" to Gross; and United States Patent Publication No. 2002/0074097 (U.S. Ser. No. 10/017,361) entitled "Softened Comminution Pulp", also to Gross.

While numerous chemical packages are available for increasing softness, wet strength and the like, additives are expensive, can make processing difficult, foul equipment and so forth. Indeed, in many cases, it is not possible to use high levels of additives; for example, in wet-press processes, the amount of debonder added by conventional means is limited to such amounts that will not interfere substantially with adhesion of the web to a rotating cylinder; typically no more than 4-5 lbs of debonder per ton of fiber can be used.

SUMMARY OF INVENTION

It has been unexpectedly found that it is possible to add high levels of debonder to wet-press processes and increase the wet/dry CD tensile ratio in accordance with the invention. Debonder is added to the furnish at relatively high consistency, upstream of a machine chest, in a pulper for example, and prior to diluting the furnish and pumping it to a headbox. Permanent wet strength resin is preferably added to the furnish subsequent to the debonder treatment. Overall properties are further enhanced by providing base sheet with a relatively low MD/CD dry tensile ratio and optionally providing a dry strength resin to the furnish.

Without intending to be bound by any theory, it is believed that treating the furnish at relatively high consistency (greater than 2 percent or greater than 3 percent) and prolonged contact times leads to much better incorporation of the debonder into the pulp, ameliorating processing issues such as adhesion difficulties and unwanted deposits on fabrics and drying equipment.

Paper tensile strength, T, is described by the Page equation, $$1/T = 9/(8Z) + 12C/(PLbRBA)$$

For present purposes, we can ignore the parameters of zero-span tensile (Z), fiber perimeter (P), fiber length (L), and fiber coarseness (C) since they are the same in a given lot of fiber. Beyond these fiber parameters, then, dry tensile is primarily governed by the Relative Bonded Area (RBA) and wet tensile by the shear bond strength term (b). As two fibers dry together they collapse upon each other—driven into flat ribbons by Campbell forces within the lumen and lamella. Any surfaces brought into close enough contact to allow a hydrogen bond (H-bond) to form will form H-bonds as the sheet dries. The combination of many H-bonds, which is one of the weaker chemical bonds, can result in considerable tensile strength. Dry tensile will further increase as one adds other stronger bonds such as ionic and covalent bonds into these contact regions, so that b increases, but the gain will be small compared to the dry strength attributed to the plethora of H-bonding. However, once the paper substrate is placed in water, all these H-bonds are broken and only those bonds resistant to water will remain to hold the structure together. The measured tensile strength under these conditions is the wet tensile.

We believe that debonder functions to lower dry strength in disproportion to wet tensile by reducing relative bonding while minimally impacting shear bond strength; or in other words, debonder affects fiber surface energy and not the microcomposite responsible for the wet strength bond. Increasing debonder dosage creates opportunity for improving wet/dry strength ratios; however, relatively high dosage levels have not previously been practical as noted above.

Large gains in wet/dry CD tensile ratios are observed with debonder add-on rates of 10-20 lbs per ton of fiber is appreciated from FIGS. 1 and 2.

FIG. 1 is a plot of wet breaking length versus dry breaking length wherein it is seen that wet/dry CD tensile ratios were increased 60 percent and more through the use of debonder treatment at a pulper. The advantages of the invention are further seen in FIG. 2, which is another plot of wet breaking length versus dry breaking length for handsheets. It is seen in FIG. 2, for example, that a refined towel substrate with a dry breaking length of 5 km or so will have a wet breaking length of approximately 0.9 km. Through the use of thick stock treatment with debonder in accordance with the invention, the wet breaking length at the same dry strength was increased to 1.4 km or 56 percent. The MD tensiles necessary for a product of a predetermined CD wet strength can be further reduced by controlling the MD/CD dry tensile ratio by way of the jet/wire velocity delta and crepe as will be appreciated from FIG. 3, which is a plot of MD/CD dry tensile ratio versus jet/wire velocity delta. It is seen in FIG. 3 that the MD/CD tensile ratios exhibit minima at delta values slightly less than 200 fpm and that a wet-crepe, fabric crepe process is less sensitive to velocity delta changes and is more readily controlled over a greater range than a conventional wet-press/dry crepe process as further discussed herein. In other words, the relative CD strength of the product may be greatly increased by controlling the jet/wire velocity delta.

Further aspects and advantages of the present invention will become readily apparent from the discussion which follows.

BRIEF DESCRIPTION OF DRAWINGS

The invention is described in detail below with reference to the various drawings, wherein like numerals designate similar ports. In the drawings:

FIG. 2 is a plot of wet CD tensile versus CD dry tensiles for handsheets made by adding a Type C quat to 1:1 unrefined southern softwood Kraft (SSWK):southern hardwood Kraft (SHWK) furnish, or 1:1 refined (590 CSF) SSWK:unrefined SHWK furnish at the thick stock prior to addition of AMRES 25HP (PAE) alone, or sequentially with AMRES 25HP and CMC;

DETAILED DESCRIPTION

Figure 1:
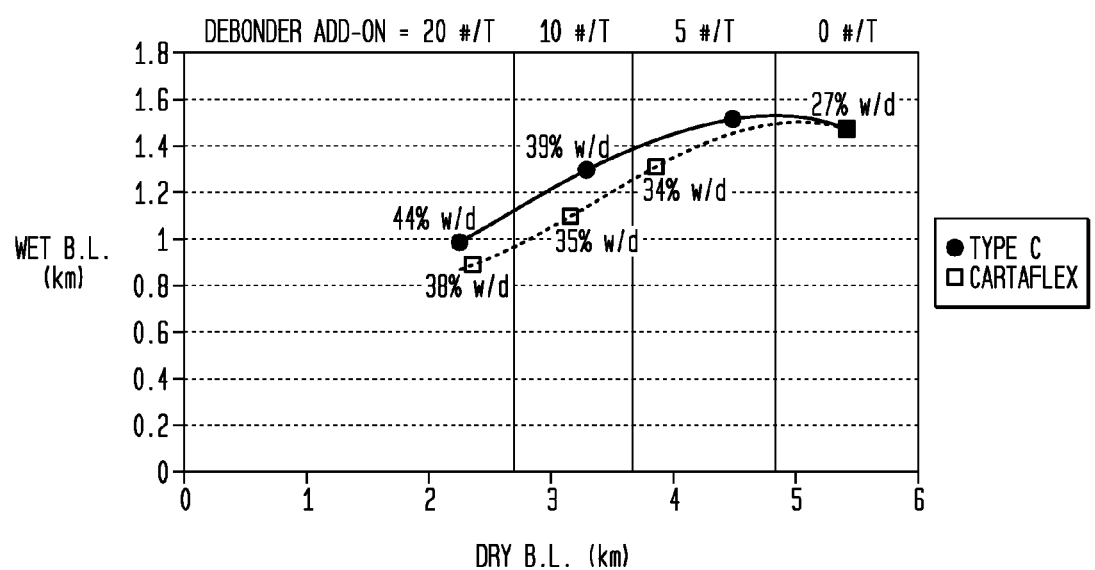
FIG. 1 is a plot of wet CD tensile versus dry CD tensile for various products showing wet/dry CD tensile ratios.

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art.

Terminology used herein is given its ordinary meaning with the exemplary definitions set forth immediately below. Test specimens are conditioned for 2 hours at 50 percent relative humidity and 23° C.±1° C. (73.4° F.±1.8° F.) unless otherwise indicated.

Water Absorbency Rate or WAR is measured in accordance with TAPPI method T-432 cm-99. Water absorbency rate is the time it takes for a sample to absorb a 0.1 gram droplet of water disposed on its surface by way of an automated syringe. The test specimens are preferably conditioned at 23° C.±1° C. (73.4±1.8° F.) at 50 percent relative humidity. For each sample, 4 3×3 inch test specimens are prepared. Each specimen is placed in a sample holder such that a high intensity lamp is directed toward the specimen. 0.1 ml of water is deposited on the specimen surface and a stop watch is started. When the water is absorbed, as indicated by lack of further reflection of light from the drop, the stopwatch is stopped and the time recorded to the nearest 0.1 seconds. The procedure is repeated for each specimen and the results averaged for the sample.

Throughout this specification and claims, when we refer to a nascent web having an apparently random distribution of fiber orientation (or use like terminology), we are referring to the distribution of fiber orientation that results when known forming techniques are used for depositing a furnish on the forming fabric. When examined microscopically, the fibers give the appearance of being randomly oriented even though, depending on the jet to wire speed, there may be a significant bias toward machine direction orientation, making the machine direction tensile strength of the web exceed the cross-direction tensile strength.

Unless otherwise specified, "basis weight", BWT, bwt, and so forth refers to the weight of a 3000 ft² ream of product. Consistency refers to percent solids of a nascent web, for example, calculated on a bone dry basis. "Air dry" means including residual moisture, by convention up to about 10 percent moisture for pulp and up to about 6 percent for paper. A nascent web having 50 percent water and 50 percent bone dry pulp has a consistency of 50 percent.

"Base sheet" refers to a unitary cellulosic sheet as manufactured by a papermachine. Base sheets may be layered; however, they have a unitary structure not readily delaminated. A "ply" of a finished product refers to base sheet incorporated into the product.

The term "cellulosic", "cellulosic sheet" and the like is meant to include any product incorporating fiber having cellulose as a major constituent.

"Papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; wood fibers such as those obtained from deciduous and coniferous trees, including softwood fibers, such as northern and southern softwood kraft fibers; and hardwood fibers, such as eucalyptus, maple, birch, aspen, or the like. Papermaking fibers can be liberated from their source material by any one of a number of chemical pulping processes familiar to one experienced in the art, including sulfate, sulfite, polysulfide, soda pulping, etc. The pulp can be bleached if desired by chemical means including the use of chlorine, chlorine dioxide, oxygen and so forth. The products of the present invention may comprise a blend of conventional fibers (whether derived from virgin pulp or recycle sources) and high coarseness lignin-rich tubular fibers, such as bleached chemical thermomechanical pulp (BCTMP). "Furnishes" and like terminology refers to aqueous compositions including papermaking fibers, wet strength resins, debonders, and the like for making paper products. Synthetic fibers may also be included in the furnish.

Kraft softwood fiber is low yield fiber made by the well known Kraft (sulfate) pulping process from coniferous material and includes northern and southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the Kraft process from hardwood sources, i.e., eucalyptus and also has generally a lignin content of less than 5 percent by weight. Kraft hardwood films are shorter than softwood fibers, typically having a length weighted average fiber length of less than 1 mm and an arithmetic average length of less than 0.5 mm or less than 0.4 mm.

Fiber length can be measured by any suitable means. A preferred system is the OpTest Fiber Quality Analyzer (FQA) from OpTest Equipment, Hawkesbury, Ontario, Canada, Model No. Code LDA 96. The FQA measures individual fiber contour and projected lengths by optically imaging fibers with a CCD camera and polarized infrared light.

Recycle fiber which is predominantly low yield fiber may be identified by lignin content. Recycle fiber having a lignin content of less than 7.5 percent by weight is presumed to be predominantly low yield fiber as opposed to groundwood.

As used herein, the "compactively dewatering the web or furnish" refers to mechanical dewatering by wet-pressing on a dewatering felt, for example, in some embodiments by use of mechanical pressure applied continuously over the web surface, as in a nip between a press roll and a press shoe wherein the web is in contact with a papermaking felt. The terminology "compactively dewatering" is used to distinguish processes wherein the initial dewatering of the web is carried out largely by thermal means as is the case, for example, in U.S. Pat. No. 4,529,480 to Trokhan and U.S. Pat. No. 5,607,551 to Farrington et al. noted above. Compactively dewatering a web thus refers, for example, to removing water from a nascent web having a consistency of less than 30 percent or so by application of pressure thereto and/or increasing the consistency of the web by about 15 percent or more by application of pressure thereto. "Wet-press", "wet-pressing" and like terminology refers to processes and machinery which include a compactive dewatering step or related equipment. Typically, a wet web is wet-pressed onto the surface of a rotating cylinder where the consistency is lowered substantially in connection with transfer, for example, where the web is transferred from a felt to a Yankee cylinder in a CWP process or the web is transferred from a felt to a transfer cylinder in a FC process. Both the CWP and FC processes described herein are wet-press processes.

Softener or debonder add-on is calculated as the weight of "as received" commercial debonder composition per ton of bone dry fiber when using a commercially available debonder composition, without regard to additional diluents or dispersants which may be added to the composition after receipt from the vendor.

Debonder compositions are typically comprised of cationic or anionic amphiphilic compounds, or mixtures thereof (hereafter referred to as surfactants) combined with other diluents and non-ionic amphiphilic compounds; where the typical content of surfactant in the debonder composition ranges from about 10 wt % to about 90 wt %. Diluents include propylene glycol, ethanol, propanol, water, polyethylene glycols, and nonionic amphiphilic compounds. Diluents are often added to the surfactant package to render the latter more tractable (i.e., lower viscosity and melting point). Some diluents are artifacts of the surfactant package synthesis (e.g., propylene glycol). Non-ionic amphiphilic compounds, in addition to controlling composition properties, can be added to enhance the wettability of the debonder, where both debonding and maintenance of absorbency properties are critical to the substrate that a debonder is applied. The nonionic amphiphilic compounds can be added to debonder compositions to disperse inherent water immiscible surfactant packages in water streams, such as encountered during papermaking. Alternatively, the nonionic amphiphilic compound, or mixtures of different non-ionic amphiphilic compounds, as indicated in U.S. Pat. No. 6,969,443 to Kokko, can be carefully selected to predictably adjust the debonding properties of the final debonder composition.

When formulating debonder composition directly from surfactants, the debonder add-on includes amphiphilic additives such as nonionic surfactant, i.e. fatty esters of polyethylene glycols and diluents such as propylene glycol, respectively, up to about 90 percent by weight of the debonder composition employed; except, however that diluent content of more than about 30 percent by weight of non-amphiphilic diluent is excluded for purposes of calculating debonder composition add-on per ton of fiber. Likewise, water content is excluded in calculating debonder add-on.

A "Type C" quat refers to an imidazolinium surfactant, while a "Type C" debonder composition refers to a debonder composition which includes Type C quat. A preferred Type C debonder composition includes Type C quat, and anionic surfactant as disclosed in U.S. Pat. No. 6,245,197 blended with nonionic amphiphilic components and other diluents as is disclosed in U.S. Pat. No. 6,969,443. The disclosures of the '197 and '443 patents are incorporated herein by reference in their entireties.

"FC" means a fabric crepe process of the class discussed in detail in connection with FIG. 5 or a product produced by that technology as the context indicates. "TAD" on the other hand, refers to products which are throughdried.

"Fpm" refers to feet per minute while "consistency" refers to the weight percent fiber of the web.

"Freeness" or CSF is determined in accordance with TAPPI Standard T 227 OM-94 (Canadian Standard Method).

Jet/wire velocity delta or like terminology refers to the difference in speed between the headbox jet issuing from a headbox and the forming wire or fabric speed in the MD; jet velocity-wire velocity delta is typically expressed in fpm. In cases where a pair of forming fabrics are used, the speed of the fabric advancing the web in the machine direction is used to calculate jet/wire velocity delta.

"MD" means machine direction and "CD" means cross-machine direction.

Nip parameters include, without limitation, nip pressure, nip width, backing roll hardness, fabric approach angle, fabric takeaway angle, uniformity, nip penetration and velocity delta between surfaces of the nip.

Nip width means the MD length over which the nip surfaces are in contact.

"Predominantly" means more than 50 percent by weight of the named species unless mole percent is specified. Papermaking fiber from which a product is made is "predominantly" softwood fiber if over 50 percent by weight of fiber in the product is softwood fiber (bone dry).

A translating transfer surface refers to the surface from which the web is creped into the creping fabric. The translating transfer surface may be the surface of a rotating drum as described hereafter, or may be the surface of a continuous smooth moving belt or another moving fabric which may have surface texture and so forth. The translating transfer surface needs to support the web and facilitate the high solids creping as will be appreciated from the discussion which follows.

Calipers and/or bulk reported herein may be 1, 4 or 8 sheet calipers. The sheets are stacked and the caliper measurement taken about the central portion of the stack. Preferably, the test samples are conditioned in an atmosphere of 23°±1.0° C. (73.4°±1.8° F.) at 50 percent relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in./sec descent rate. For finished product testing, each sheet of product to be tested must have the same number of plies as the product is sold. For testing in general, eight sheets are selected and stacked together. For napkin testing, napkins are enfolded prior to stacking. For base sheet testing off of winders, each sheet to be tested must have the same number of plies as produced off the winder. For base sheet testing off of the papermachine reel, single plies must be used. Sheets are stacked together aligned in the MD. For handsheets, single sheet caliper is used. On custom embossed or printed product, try to avoid taking measurements in these areas if at all possible. Bulk may also be expressed in units of volume/weight by dividing caliper by basis weight.

Dry tensile strengths (MD and CD), stretch, ratios thereof, break modulus, stress and strain are measured with a standard Instron test device or other suitable elongation tensile tester which may be configured in various ways, typically using 3 or 1 inch wide strips of tissue or towel, conditioned for 2 hours at 50 percent relative humidity and 23° C.±1° C. (73.4° F.±1.8° F.), with the tensile test run at a crosshead speed of 2 in/min. Tensile strength is typically reported in breaking length (km) or g/3".

Unless otherwise specified, a tensile property is a "dry" property at break (i.e., peak value).

Tensile ratios are simply ratios of the values determined by way of the foregoing methods. Dry tensile ratio refers to the MD/CD dry tensile ratio unless otherwise stated. Tensile strength is sometimes referred to simply as tensile.

Wet tensile is measured using a three-inch wide strip of sheet that is folded into a loop, clamped in a special fixture termed a Finch Cup, then immersed in water. The Finch Cup, which is available from the Thwing-Albert Instrument Company of Philadelphia, Pa., is mounted onto a tensile tester equipped with a 2.0 pound load cell with the flange of the Finch Cup clamped by the tester's lower jaw and the ends of the specimen loop clamped into the upper jaw of the tensile tester. The sample is immersed in water that has been adjusted to a pH of 7.0+ or −0.1 and the tensile is tested after a 5 second immersion time. The results are expressed in breaking length (km) or g/3", dividing by two to account for the loop as appropriate.

Wet/dry tensile ratios are expressed in percent by multiplying the wet/dry ratio by 100. For towel products, the wet/dry CD tensile ratio is the most relevant. Throughout this specification and claims which follow, "wet/dry ratio" or like terminology refers to the wet/dry CD tensile ratio unless clearly specified otherwise. For handsheets, MD and CD values are equivalent.

"Belt Crepe Ratio" or "Fabric Crepe Ratio" is an expression of the speed differential between a creping belt or creping fabric and the forming wire, and typically calculated as the ratio of the web speed immediately before creping and the web speed immediately following creping, because the forming wire and transfer surface are typically, but not necessarily, operated at the same speed:

Belt Crepe Ratio=transfer cylinder speed÷creping belt speed

Belt Crepe can also be expressed as a percentage calculated as:

Belt Crepe percent=(Belt Crepe Ratio−1)×100 percent

Line crepe (sometimes referred to as overall crepe), reel crepe and so forth are similarly calculated. A web creped from a Yankee moving at a speed of 1000 fpm and wound onto a reel at 910 fpm has a reel crepe ratio of approximately 1.1 and a reel crepe of approximately 10 percent.

PLI or pli means pounds force per linear inch.

Pusey and Jones (P+J) hardness (indentation), sometimes referred to simply as P+J, is measured in accordance with ASTM D 531, and refers to the indentation number (standard specimen and conditions).

Velocity delta means a difference in linear speed.

It has been found in accordance with the present invention that elevated wet/dry CD tensile ratios are exhibited when the papermaking fibers are pretreated with a debonder or softener composition prior to their incorporation into the web. In this respect, the present invention may employ debonders including amido amine salts derived from partially acid neutralized amines. Such materials are disclosed in U.S. Pat. No. 4,720, 383. Evans, *Chemistry and Industry,* 5 Jul. 1969, pp. 893-903; Egan, *J. Am. Oil Chemist's Soc.,* Vol. 55 (1978), pp. 118-121; and Trivedi et al., *J. Am. Oil Chemist's Soc.,* June 1981, pp. 754-756, incorporated by reference in their entirety, indicate that softeners are often available commercially only as complex mixtures rather than as single compounds. While the following discussion will focus on the predominant surfactant species, it should be understood that commercially available mixtures and compositions would generally be used in practice.

Quasoft 202-JR is a suitable material, which includes surfactant derived by alkylating a condensation product of oleic acid and diethylenetriamine. Synthesis conditions using a deficiency of alkylation agent (e.g., diethyl sulfate) and only one alkylating step, followed by pH adjustment to protonate the non-ethylated species, result in a mixture consisting of cationic ethylated and cationic non-ethylated species. A minor proportion (e.g., about 10 percent) of the resulting amido amine cyclize to imidazoline compounds. Since only the minor amounts of diethylquat and imidazolinium portions of these materials are permanently quaternary ammonium compounds, the compositions as a whole are pH-sensitive. Therefore, in the practice of the present invention with this class of chemicals, the pH in the head box should be approximately 6 to 8, more preferably 6.5 to 8 and most preferably 7 to 8.

Quaternary ammonium compounds, such as dialkyl dimethyl quaternary ammonium salts are also suitable particularly when the alkyl groups contain from about 10 to 24 carbon atoms. These compounds have the advantage of being relatively insensitive to pH.

Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entirety. The compounds are biodegradable diesters of quaternary ammonia compounds, quaternized amine-esters, and biodegradable vegetable oil based esters functional with quaternary ammonium chloride and diester dierucyldimethyl ammonium chloride and are representative biodegradable softeners.

Debonder compositions may include dialkyldimethyl-ammonium salts of the formula:

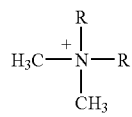

bis-dialkylamidoammonium salts of the formula:

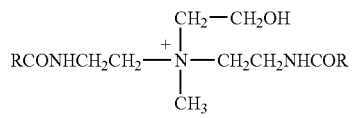

as well as dialkylmethylimidazolinium salts (Type C quats) of the formula:

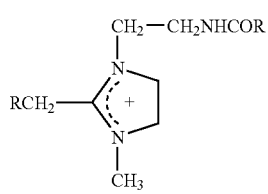

wherein each R may be the same or different and each R indicates a hydrocarbon chain having a chain length of from about twelve to about twenty-two carbon atoms and may be saturated or unsaturated; and wherein said compounds are associated with a suitable anion. One suitable salt is a dialkylimidazolinium compound and the associated anion is methylsulfate. Exemplary quaternary ammonium surfactants include hexamethonium bromide, tetraethylammonium bromide, lauryl trimethylammonium chloride, dihydrogenated tallow dimethylammonium methyl sulfate, oleyl imidazolinium, and so forth.

A nonionic surfactant component such as PEG diols and PEG mono or diesters of fatty acids, and PEG mono or diethers of fatty alcohols may be used as well, either alone or in combination with a quaternary ammonium surfactant. Suitable compounds include the reaction product of a fatty acid or fatty alcohol with ethylene oxide, for example, a polyethylene glycol (PEG) diester or PEG diether, respectively. Examples of nonionic surfactants that can be used are polyethylene glycol dioleate, polyethylene glycol dilaurate, polypropylene glycol dioleate, polypropylene glycol dilaurate, polyethylene glycol monooleate, polyethylene glycol monolaurate, polypropylene glycol monooleate and polypropylene glycol monolaurate and so forth. Further details may be found in U.S. Pat. No. 6,969,443 of Bruce Kokko, entitled "Method of Making Absorbent Sheet from Recycle Furnish".

After debonder treatment, the pulp is mixed with strength adjusting agents such as permanent wet strength resin (WSR), optionally dry strength agents and so forth before the sheet is formed. Suitable permanent wet strength agents are known to the skilled artisan. A comprehensive but non-exhaustive list of useful strength aids include urea-formaldehyde resins, melamine formaldehyde resins, glyoxylated polyacrylamide resins, polyamide-epichlorohydrin resins and the like. Thermosetting polyacrylamides are produced by reacting acrylamide with diallyl dimethyl ammonium chloride (DADMAC) to produce a cationic polyacrylamide copolymer which is ultimately reacted with glyoxal to produce a cationic cross-linking wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference in their entirety. Resins of this type are commercially available under the trade name of PAREZ. Different mole ratios of acrylamide/-DADMAC/glyoxal can be used to produce cross-linking resins, which are useful as wet strength agents. Furthermore, other dialdehydes can be substituted for glyoxal to produce thermosetting wet strength characteristics. Of particular utility are the polyamide-epichlorohydrin permanent wet strength resins, an example of which is sold under the trade names Kymene 557LX and Kymene 557H by Hercules Incorporated of Wilmington, Del. and Amres® from Georgia-Pacific Resins, Inc. These resins and the process for making the resins are described in U.S. Pat. Nos. 3,700,623 and 3,772,076 each of which is incorporated herein by reference in its entirety. An extensive description of polymeric-epihalohydrin resins is given in Chapter 2: *Alkaline-Curing Polymeric Amine-Epichlorohydrin* by Espy in *Wet Strength Resins and Their Application* (L. Chan, Editor, 1994), herein incorporated by reference in its entirety. A reasonably comprehensive list of wet strength resins is described by Westfelt in *Cellulose Chemistry and Technology* Volume 13, p. 813, 1979, which is incorporated herein by reference.

Suitable dry strength agents include starch, guar gum, polyacrylamides, carboxymethyl cellulose (CMC) and the like. Of particular utility is carboxymethyl cellulose, an example of which is sold under the trade name Hercules CMC, by Hercules Incorporated of Wilmington, Del.

An absorbent paper web is typically made commercially by dispersing papermaking fibers and other papermaking components noted above into an aqueous furnish (slurry) and depositing the aqueous furnish onto the forming wire of a papermaking machine, typically by way of a jet issuing from a headbox. Any suitable forming scheme might be used. For example, an extensive but non-exhaustive list in addition to Fourdrinier formers includes a crescent former, a C-wrap twin wire former, an S-wrap twin wire former, or a suction breast roll former. The forming fabric can be any suitable foraminous member, including single layer fabrics, double layer fabrics, triple layer fabrics, photopolymer fabrics, and the like. Non-exhaustive background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808 all of which are incorporated herein by reference in their entirety. One forming fabric particularly useful with the present invention is Voith Fabrics Forming Fabric 2164 made by Voith Fabrics Corporation, Shreveport, La.

The nascent web may be dewatered on a papermaking felt. Any suitable felt may be used. For example, felts can have double-layer base weaves, triple-layer base weaves, or laminated base weaves. Preferred felts are those having the laminated base weave design. A wet-press-felt which may be particularly useful with the present invention is Vector 3 made by Voith Fabric. Background art in the press felt area includes U.S. Pat. Nos. 5,657,797; 5,368,696; 4,973,512; 5,023,132; 5,225,269; 5,182,164; 5,372,876; and 5,618,612. A differential pressing felt as is disclosed in U.S. Pat. No. 4,533,437 to Curran et al. may likewise be utilized.

In wet-crepe, fabric crepe processes, referred to as FC processes herein, suitable creping or textured fabrics include single layer or multi-layer, or composite preferably open meshed structures. Fabric construction per se is of less importance than the topography of the creping surface in the creping nip as discussed in more detail below. Long MD knuckles with slightly lowered CD knuckles are greatly preferred for some products. Fabrics may have at least one of the following characteristics: (1) on the side of the creping fabric that is in contact with the wet web (the "top" side), the number of machine direction (MD) strands per inch (mesh) is from 10 to 200 and the number of cross-direction (CD) strands per inch (count) is also from 10 to 200; (2) the strand diameter is typically smaller than 0.050 inch; (3) on the top side, the distance between the highest point of the MD knuckles and the highest point on the CD knuckles is from about 0.001 to about 0.02 or 0.03 inch; (4) in between these two levels there can be knuckles formed either by MD or CD strands that give the topography a three dimensional hill/valley appearance which is imparted to the sheet; (5) the fabric may be oriented in any suitable way so as to achieve the desired effect on processing and on properties in the product; the long warp knuckles may be on the top side to increase MD ridges in the product, or the long shute knuckles may be on the top side if more CD ridges are desired to influence creping characteristics as the web is transferred from the transfer cylinder to the creping fabric; and (6) the fabric may be made to show certain geometric patterns that are pleasing to the eye, which is typically repeated between every two to 50 warp yarns. One preferred fabric is a W013 Albany International multilayer fabric. Such fabrics are formed from monofilament polymeric fibers having diameters typically ranging from about 0.25 mm to about 1 mm. Such fabrics are formed from monofilament polymeric fibers having diameters typically ranging from about 10 mm to about 100 mm. This fabric may be used to produce an absorbent cellulosic sheet having variable local basis weight comprising a papermaking fiber reticulum provided with (i) a plurality of cross-machine direction (CD) extending, fiber-enriched pileated regions of relatively high local basis weight interconnected by (ii) a plurality of elongated densified regions of compressed papermaking fibers, the elongated densified regions having relatively low local basis weight and are generally oriented along the machine direction (MD) of the sheet. The elongated densified regions are further characterized by an MD/CD aspect ratio of at least 1.5. Typically, the MD/CD aspect ratios of the densified regions are greater than 2 or greater than 3; generally between about 2 and 10. In most cases the fiber-enriched, pileated regions have fiber orientation bias along the CD of the sheet and the densified regions of relatively low basis weight extend in the machine direction and also have fiber orientation bias along the CD of the sheet. This product is further described in copending application U.S. Provisional Patent Application Ser. No. 60/808,863, filed May 26, 2006, entitled "Fabric Creped Absorbent Sheet with Variable Local Basis Weight", the disclosure of which is incorporated herein in its entirety by reference.

The creping fabric may be of the class described in U.S. Pat. No. 5,607,551 to Farrington et al., Cols. 7-8 thereof, as well as the fabrics described in U.S. Pat. No. 4,239,065 to Trokhan and U.S. Pat. No. 3,974,025 to Ayers. Such fabrics may have about 20 to about 60 meshes per inch and are formed from monofilament polymeric fibers having diameters typically ranging from about 0.008 to about 0.025 inches. Both warp and weft monofilaments may, but need not necessarily be of the same diameter.

In some cases the filaments are so woven and complimentarily serpentinely configured in at least the Z-direction (the thickness of the fabric) to provide a first grouping or array of coplanar top-surface-plane crossovers of both sets of filaments; and a predetermined second grouping or array of sub-top-surface crossovers. The arrays are interspersed so that portions of the top-surface-plane crossovers define an array of wicker-basket-like cavities in the top surface of the fabric, which cavities are disposed in staggered relation in both the machine direction (MD) and the cross-machine direction (CD), and so that each cavity spans at least one sub-top-surface crossover. The cavities are discretely perimetrically enclosed in the plan view by a picket-like-lineament comprising portions of a plurality of the top-surface plane crossovers. The loop of fabric may comprise heat set monofilaments of thermoplastic material; the top surfaces of the coplanar top-surface-plane crossovers may be monoplanar flat surfaces. Specific embodiments of the invention include satin weaves as well as hybrid weaves of three or greater sheds, and mesh counts of from about 10×10 to about 120×120 filaments per inch (4×4 to about 47×47 per centimeter). Although the preferred range of mesh counts is from about 18 by 16 to about 55 by 48 filaments per inch (9×8 to about 22×19 per centimeter).

Instead of an impression fabric, a dryer fabric may be used as the creping fabric if so desired. Suitable fabrics are described in U.S. Pat. No. 5,449,026 (woven style) and U.S. Pat. No. 5,690,149 (stacked MD tape yarn style) to Lee as well as U.S. Pat. No. 4,490,925 to Smith (spiral style).

A creping adhesive used on a Yankee cylinder is preferably capable of cooperating with the web at intermediate moisture to facilitate transfer from the creping fabric to the Yankee and to firmly secure the web to the Yankee cylinder as it is dried to a consistency of 95 percent or more on the cylinder, preferably with a high volume drying hood. The adhesive is critical to stable system operation at high production rates and is preferably a hygroscopic, re-wettable, substantially non-cross-linking adhesive in the case of the Fabric Crepe process described herein. Examples of preferred adhesives are those which include poly(vinyl alcohol) of the general class described in U.S. Pat. No. 4,528,316 to Soerens et al. Other suitable adhesives are disclosed in co-pending U.S. Provisional Patent Application Ser. No. 60/372,255, filed Apr. 12, 2002, entitled "Improved Creping Adhesive Modifier and Process for Producing Paper Products". The disclosures of the '316 patent and the '255 application are incorporated herein by reference. Suitable adhesives are optionally provided with modifiers and so forth. It is preferred to use cross-linker sparingly or not at all in the adhesive in many cases; such that the resin is substantially non-crosslinkable in use.

EXAMPLES 1-7

Handsheet Preparation

British handsheets were prepared to a target basis weight of around 60 g/m$^2$ by treating either a 1:1 unrefined SSWK:SHWK furnish or a 1:1 refined (590 CSF) SSWK:unrefined SHWK furnish sequentially with a debonder, AMRES HP25 (PAE), and carboxymethyl-cellulose (CMC), pressing at 15 psi/5 min, drying on a heated drum dryer, and curing in a forced air oven at 105° C./5 min. For all preparations designated "pulper treatments" the debonder was added to the furnish and disintegrated in a British disintegrator for 30 min @ 3 percent consistency, then treated with the PAE followed by CMC between 5 min intervals. The same procedure was used for treatments designated thick stock treatments except the debonder is added to the thick stock after the latter had been disintegrated for 30 min. After adding the debonder the furnish was stirred for 15 min prior to addition of PAE and CMC.

The debonders employed were Cartaflex® TNS available from Clariant and an imidazolinium based debonder (referred to as "Type C" debonder in Table 1 below). Generally, The Type C quat can either be 1-(2-alkylamidoethyl)-2-alkyl-3-methylimidazolinium methyl sulfate or halide or 1-(2-alkylamidoethyl)-2-alkyl-3-ethylimidazolinium ethylsulfate or halide salts; where the content of the Type C quat in the debonder composition ranges from about 10 wt % to about 90 wt % of the debonder composition.

Details and results appear in FIG. 1 and in Table 1.

TABLE 1

Handsheet Data

| | Wet End Chemicals | | | | | | Strength | | | | | |
| | Type | | | | | | Bulk | | Dry | | Wet | | WAR |
| Sample | C, #/T | Cartaflex® TNS, #/T | WSR, #/T | CMC, #/T | B.W. lbs./rm | B.W. g/m$^2$ | Caliper, mils | Bulk, cm$^3$/g | Tensile, g | B.L., km | Tensile, g | B.L., km | W/D Ratio | 0.1 mL, sec. |
|---|---|---|---|---|---|---|---|---|---|---|---|---|---|---|
| 1 | 0 | 0 | 20 | 4 | 39.4 | 64.1 | 6.3 | 2.5 | 8816 | 5.411 | 2399 | 1.473 | 27.2 | 21.0 |
| 2 | 0 | 5 | 20 | 4 | 39.9 | 64.9 | 6.8 | 2.7 | 6377 | 3.870 | 2154 | 1.307 | 33.8 | 15.4 |
| 3 | 0 | 10 | 20 | 4 | 40.8 | 66.4 | 6.9 | 2.6 | 5343 | 3.167 | 1848 | 1.095 | 34.6 | 13.2 |
| 4 | 0 | 20 | 20 | 4 | 40.2 | 65.5 | 6.9 | 2.7 | 3930 | 2.363 | 1472 | 0.885 | 37.5 | 12.4 |
| 5 | 5 | 0 | 20 | 4 | 40.3 | 65.6 | 6.4 | 2.5 | 7459 | 4.478 | 2519 | 1.512 | 33.8 | 16.3 |
| 6 | 10 | 0 | 20 | 4 | 40.3 | 65.6 | 6.6 | 2.6 | 5481 | 3.291 | 2151 | 1.291 | 39.2 | 14.9 |
| 7 | 20 | 0 | 20 | 4 | 41.6 | 67.7 | 6.9 | 2.6 | 3880 | 2.255 | 1694 | 0.985 | 43.7 | 16.0 |

It is seen in FIG. 1 that dramatic increases in wet/dry ratios were achieved, particularly at debonder treatment levels of 10 lbs debonder/ton of fiber and more.

Additional Handsheet Examples

Additional handsheet trials with Type C quat-based debonder compositions showed that debonders performed equally well when added during pulping at 3 percent or more consistency or when added later to thick stock at 3 percent consistency, prior to the addition of wet strength resin and dry strength resin. The procedures employed were as noted in connection with Examples 1-7. It is preferable to add the debonder before the strength additives. While not to be bound by theory, it is believed that adding the debonder before the strength additives maximizes debonder retention in the substrate.

Figure 4:
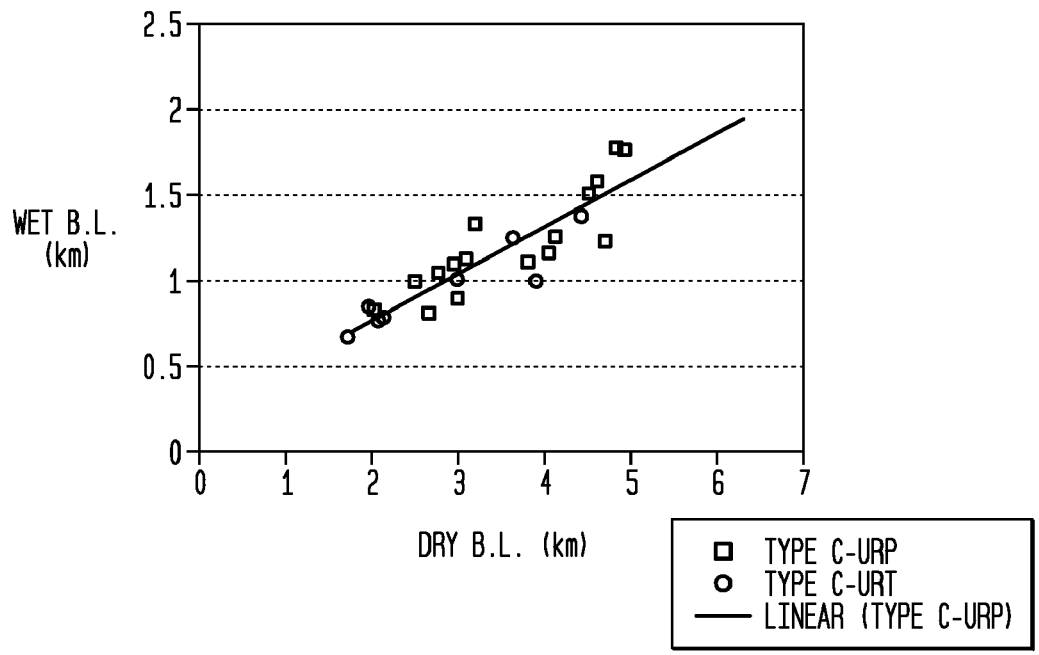
FIG. 4 is a plot of wet CD tensile versus dry CD tensile for handsheets made by adding a Type C quat to 1:1 unrefined SSWK:SHWK furnish at the pulper (British disintegrator), or thick stock prior to addition of AMRES 25HP and CMC.

Results are seen in FIGS. 2 and 4, wherein "Type C" refers to debonder treatment with Type C debonder, "R" means refined pulp; "UR" refers to unrefined pulp, "T" refer to thick stock addition and "P" refers to addition occurring during pulping. Results for refined and unrefined fiber appear in FIG. 2, while results for unrefined furnish appear in FIG. 4.

It is seen in FIG. 2 that treating the refined fibers with debonder shifts the CD wet tensile to higher levels at a given wet tensile; 50 percent higher CD wet tensiles and more at a given dry tensile, allowing for large reduction in dry strength where wet strength is the limiting property. It will be appreciated form FIG. 4 that, inasmuch as the debonder performs well at high levels when added at the machine chest, it is better to add the debonder as far "upstream" in the system as possible, preferably before the machine chest in a commercial unit.

Figure 5:
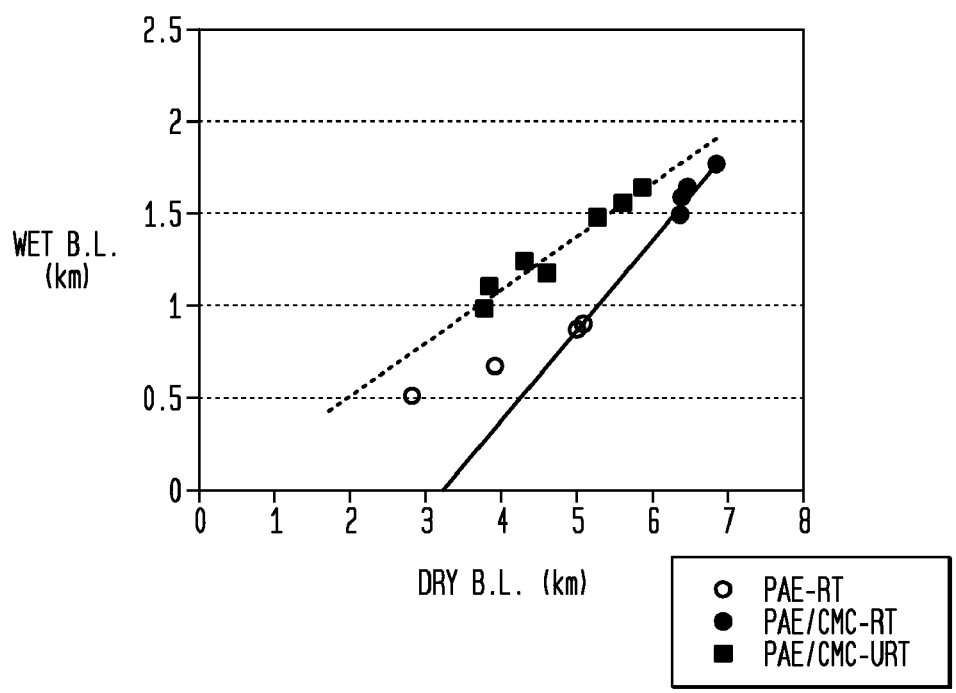
FIG. 5 is a plot of wet CD tensile versus dry CD tensile for handsheets made without debonder pre-treatment, specifically for handsheets made with 1:1 unrefined SSWK:SHWK furnish, or 1:1 refined (590 CSF) SSWK:unrefined SHWK furnish, treated with either AMRES 25HP (PAE) alone or sequentially with PAE and CMC in the thick stock.

An unexpected relationship between debonder treatment and refining is revealed by isolating the "control" data of FIG. 2, that is, no debonder treatment, in FIG. 5. In FIG. 5, it is seen that refining has a negative impact on wet/dry ratio; however, it is seen in FIG. 2 that such negative impact is reversed by the debonder treatment at high consistency. These unexpected results provide better flexibility in meeting product specifications since the wet and dry strength properties can be better managed through refining without adverse impact in wet/dry ratio.

Figure 6:
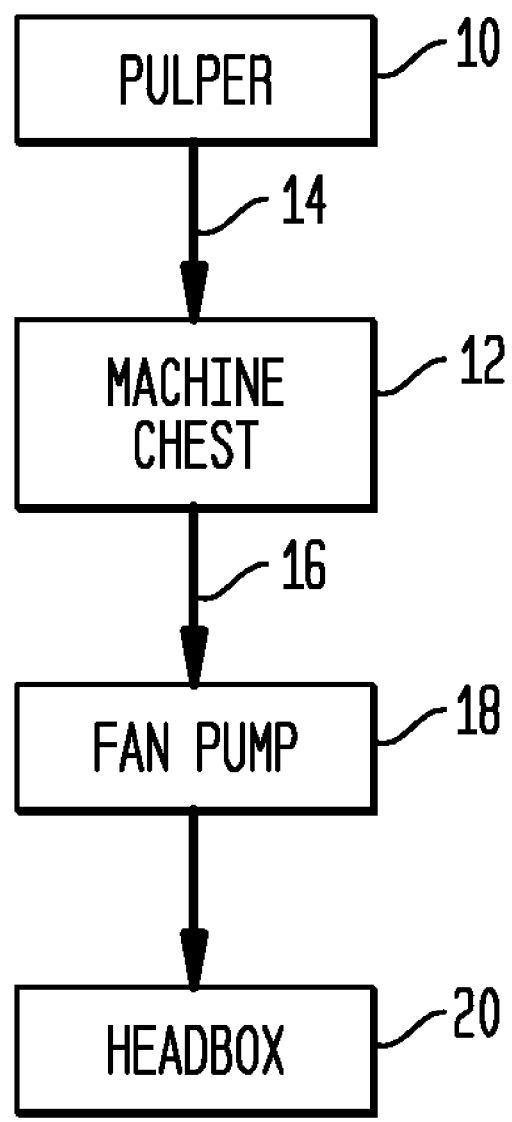
FIG. 6 is a flow diagram illustrating fiber pre-treatment prior to feeding the furnish to a papermachine.

In a typical application of the present invention, debonder is added to the furnish in a pulper 10 as shown in FIG. 6 which is a flow diagram illustrating schematically pulp feed to a papermachine. Debonder is added in pulper 10 while the fiber is at a consistency of anywhere from about 4 percent to about 10 percent, typically around 6 percent. Thereafter, the mixture is pulped after debonder addition for 10 minutes or more before wet strength or dry strength resin is added. The pulped fiber is fed forward to a machine chest 12 and diluted, typically to a consistency of 3 percent or so. In machine chest 12 other additives, including permanent wet strength resin and dry strength resin, may be added. If so desired, the wet strength resin and dry strength resin may be added in the pulper or upstream or downstream of the machine chest, i.e., at 14 or 16; however, they should be added after debonder as noted above and the dry strength resin is preferably added after the wet strength resin. The furnish may be refined and/or cleaned before or after it is provided to the machine chest as is known in the art.

From machine chest 12, the furnish is further diluted to a consistency of less than 2 percent, generally less than 1 percent and typically 0.1 percent or so and fed forward to a headbox 20 by way of a fan pump 18.

Figure 7:
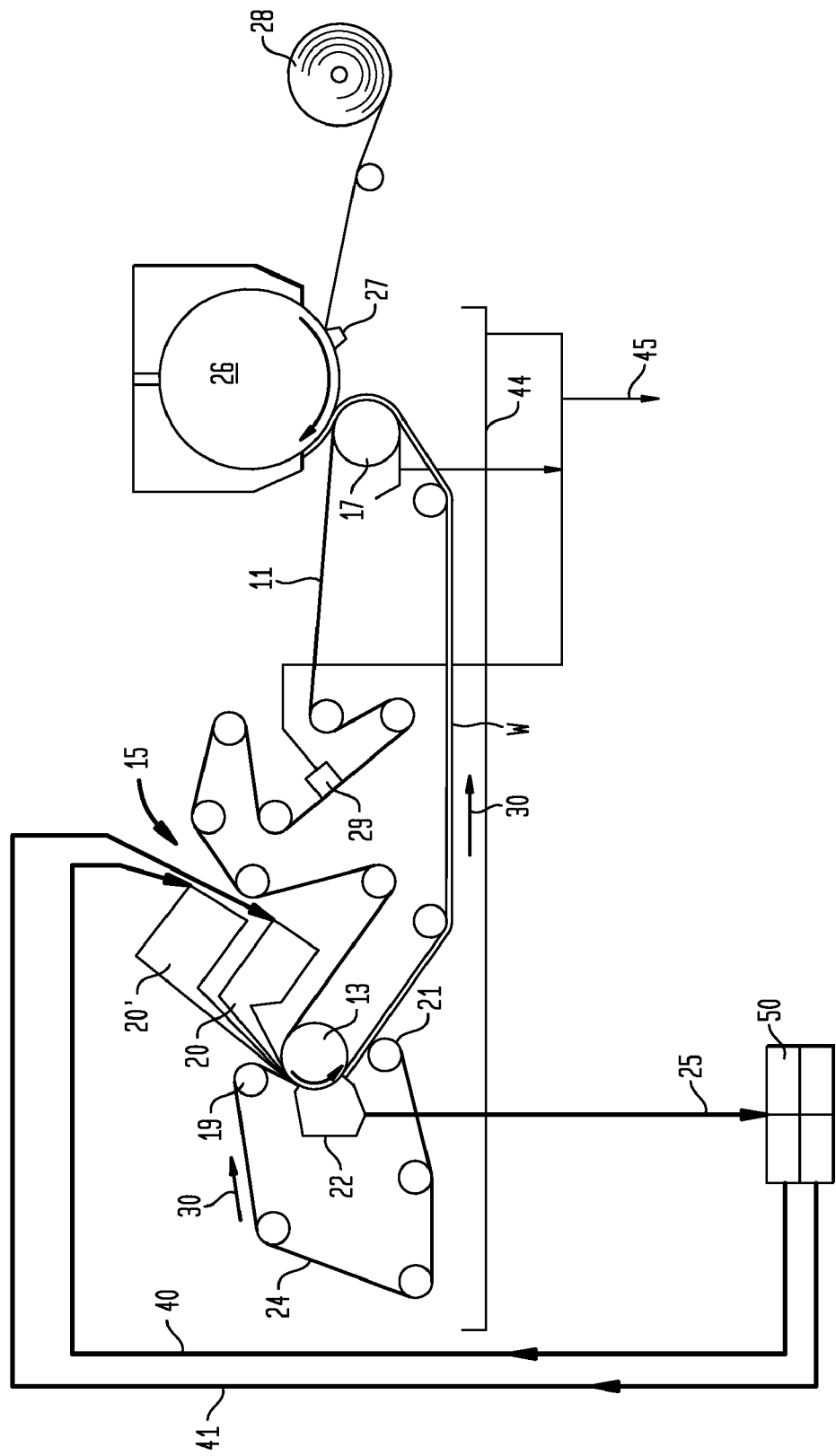
FIG. 7 is a schematic diagram of a conventional wet-press (CWP) papermachine.

There is shown in FIG. 7 a schematic diagram of a conventional wet-press (CWP) papermachine 15 with a divided headbox thereby making it possible to produce a stratified product. The product according to the present invention can be made with single or multiple headboxes, 20, 20' and regardless of the number of headboxes may be stratified or unstratified. The treated furnish is transported through different conduits 40 and 41, where it is delivered to the headbox of papermachine 15 as is well known, although any convenient configuration can be used.

FIG. 7 shows a web-forming end or wet end with a liquid permeable foraminous support member 11 which may be of any convenient configuration. Foraminous support member 11 may be constructed of any of several known materials including a conventional papermaking felt, fabric or a synthetic filament woven mesh base with a very fine synthetic fiber batt attached to the mesh base. The foraminous support member 11 is supported in a conventional manner on rolls, including breast roll 13, and pressing roll, 17.

A forming fabric 24 is supported on rolls 19 and 21 which are positioned relative to the breast roll 13 for guiding the forming wire 24 to converge on the foraminous support member 11 at the cylindrical breast roll 13 at an acute angle relative to the foraminous support member 11. The foraminous support member 11 and the wire 24 move at the same speed and in the same direction which is the direction of rotation of the breast roll 13. The forming wire 24 and the foraminous support member 11 converge at an upper surface of the forming roll 13 to form a wedge-shaped space or nip into which one or more jets of water or foamed liquid fiber dispersion may be injected and trapped between the forming wire 24 and the foraminous support member 11 to force fluid through the wire 24 into a save-all 22 where it is collected for re-use in the process (recycled via line 25).

The nascent web W formed in the process is carried along the machine direction 30 by the foraminous support member 11 to the pressing roll 17 where the wet nascent web W is transferred to the Yankee dryer 26. Fluid is pressed from the wet web W by pressing roll 17 as the web is transferred to the Yankee dryer 26 where it is dried and creped by means of a creping blade 27. The finished web is collected on a take-up reel 28.

A pit 44 is provided for collecting water squeezed from the furnish by the press roll 16, as well as collecting the water removed from the fabric by a Uhle box 29. The water collected in pit 44 may be collected into a flow line 45 for separate processing to remove surfactant and fibers from the water and to permit recycling of the water back to the papermaking machine 15.

Figure 8:
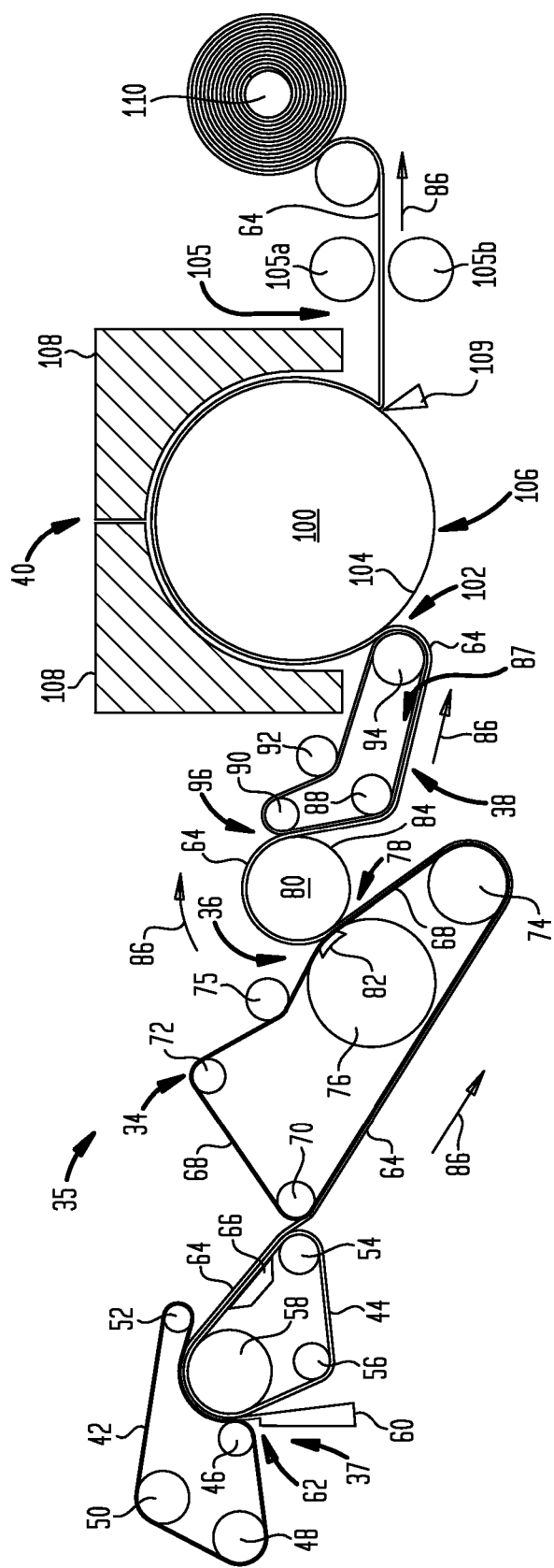
FIG. 8 is a schematic diagram of a wet-press, wet crepe fabric crepe (FC) papermachine.

FIG. 8 is a schematic diagram of another wet-press/fabric crepe papermachine 35 having a conventional twin wire forming section 37, a felt run 34, a shoe press section 36, a creping fabric 38 and a Yankee dryer 40 suitable for making sheet used in connection with the present invention. Forming section 37 includes a pair of forming fabrics 42, 44 supported by a plurality of rolls 46, 48, 50, 52, 54, 56 and a forming roll 58. A headbox 60 provides papermaking furnish in the form of a jet to a nip 62 between forming roll 58 and roll 46 and the fabrics. Control of the jet velocity relative to the forming fabrics is an important aspect of controlling tensile ratio as will be appreciated by one of skill in the art. The furnish forms a nascent web 64 which is dewatered on the fabrics with the assistance of suction, for example, by way of suction box 66.

The nascent web is advanced to a papermaking felt 68 which is supported by a plurality of rolls 70, 72, 74, 75 and the felt is in contact with a shoe press roll 76. The web is of low consistency as it is transferred to the felt. Transfer may be assisted by suction; for example roll 70 may be a suction roll if so desired or a pickup or suction shoe as is known in the art. As the web reaches the shoe press roll it may have a consistency of 10-25 percent, preferably 20 to 25 percent or so as it enters nip 78 between shoe press roll 76 and transfer roll 80. Transfer roll 80 may be a heated roll if so desired. Instead of a shoe press roll, roll 76 could be a conventional suction pressure roll. If a shoe press is employed it is desirable and preferred that roll 74 is a suction roll effective to remove water from the felt prior to the felt entering the shoe press nip since water from the furnish will be pressed into the felt in the shoe press nip. In any case, using a suction roll or STR at 74 is typically desirable to ensure the web remains in contact with the felt during the direction change as one of skill in the art will appreciate from the diagram.

Web 64 is wet-pressed on the felt in nip 78 with the assistance of pressure shoe 82. The web is thus compactively dewatered at 78, typically by increasing the consistency by 15 or more points at this stage of the process. The configuration shown at 78 is generally termed a shoe press; in connection with the present invention cylinder 80 is operative as a transfer cylinder which operates to convey web 64 at high speed, typically 1000 fpm-6000 fpm to the creping fabric.

Cylinder 80 has a smooth surface 84 which may be provided with adhesive and/or release agents if needed. Web 64 is adhered to transfer surface 84 of cylinder 80 which is rotating at a high angular velocity as the web continues to advance in the machine-direction indicated by arrows 86. On the cylinder, web 64 has a generally random apparent distribution of fiber.

Direction 86 is referred to as the machine-direction (MD) of the web as well as that of papermachine 35; whereas the cross-machine-direction (CD) is the direction in the plane of the web perpendicular to the MD.

Web 64 enters nip 78 typically at consistencies of 10-25 percent or so and is dewatered and dried to consistencies of from about 25 to about 70 percent by the time it is transferred to creping fabric 38 as shown in the diagram.

Fabric 38 is supported on a plurality of rolls 88, 90, 92 and a press nip roll or solid pressure roll 94 such that there is formed a fabric crepe nip 96 with transfer cylinder 80 as shown in the diagram.

The creping fabric defines a creping nip over the distance in which creping fabric 38 is adapted to contact roll 80; that is, applies significant pressure to the web against the transfer cylinder. To this end, backing (or creping) roll 90 may be provided with a soft deformable surface which will increase the width of the creping nip and increase the fabric creping angle between the fabric and the sheet and the point of contact or a shoe press roll could be used as roll 90 to increase effective contact with the web in high impact fabric creping nip 96 where web 64 is transferred to fabric 38 and advanced in the machine-direction. By using different equipment at the creping nip, it is possible to adjust the fabric creping angle or the takeaway angle from the creping nip. Thus, it is possible to influence the nature and amount of redistribution of fiber, as well as delamination/debonding which may occur at fabric creping nip 96 by adjusting these nip parameters. In some embodiments it may by desirable to restructure the z-direction interfiber characteristics while in other cases it may be desired to influence properties only in the plane of the web. The creping nip parameters can influence the distribution of fiber in the web in a variety of directions, including inducing changes in the z-direction as well as the MD and CD. In any case, the transfer from the transfer cylinder to the creping fabric is high impact in that the fabric is traveling slower than the web and a significant velocity change occurs. Typically, the web is creped anywhere from 10-60 percent and even higher during transfer from the transfer cylinder to the fabric.

Creping nip 96 generally extends over a fabric creping nip width of anywhere from about 1/8" to about 2", typically 1/2" to 2". For a creping fabric with 32 CD strands per inch, web 64 thus will encounter anywhere from about 4 to 64 weft filaments in the nip.

The nip pressure in nip 96, that is, the loading between backing roll 90 and transfer roll 80 is suitably 20-100, preferably 40-70 pounds per linear inch (PLI).

After fabric creping, the web continues to advance along MD 86 where it is wet-pressed onto Yankee cylinder 100 in transfer nip 102. Transfer at nip 102 occurs at a web consistency of generally from about 25 to about 70 percent. At these consistencies, it is difficult to adhere the web to surface 104 of cylinder 100 firmly enough to remove the web from the fabric thoroughly. Typically, a poly(vinyl alcohol)/polyamide adhesive composition as noted above is applied at 106 as needed.

If so desired, a suction box may be employed at 87 in order to increase caliper. Typically, suction of from about 5 to about 30 inches of mercury is employed.

The web is dried on Yankee cylinder 100 which is a heated cylinder and by high jet velocity impingement air in Yankee hood 108. As the cylinder rotates, web 64 is creped from the cylinder by creping doctor (blade) 109 and wound on a take-up reel 110. Creping of the paper from a Yankee dryer may be carried out using an undulatory creping blade, such as that disclosed in U.S. Pat. No. 5,690,788, the disclosure of which is incorporated by reference. Use of the undulatory crepe blade has been shown to impart several advantages when used in production of tissue products. In general, tissue products creped using an undulatory blade have higher caliper (thickness), increased CD stretch, and a higher void volume than do comparable tissue products produced using conventional crepe blades. All of these changes effected by use of the undulatory blade tend to correlate with improved softness perception of the tissue products.

There is optionally provided a calender station 105 with rolls 105(a), 105(b) to calender the sheet, if so desired.

When a wet-crepe process is employed, an impingement air dryer, a through-air dryer, or a plurality of can dryers can be used instead of a Yankee. Impingement air dryers are disclosed in the following patents and applications, the disclosure of which is incorporated herein by reference:

U.S. Pat. No. 5,865,955 of Ilvespaaet et al.
U.S. Pat. No. 5,968,590 of Ahonen et al.
U.S. Pat. No. 6,001,421 of Ahonen et al.
U.S. Pat. No. 6,119,362 of Sundqvist et al.
U.S. patent application Ser. No. 09/733,172, entitled "Wet Crepe, Impingement-Air Dry Process for Making Absorbent Sheet", now U.S. Pat. No. 6,432,267.

Throughdrying units are well known in the art and described in U.S. Pat. No. 3,432,936 to Cole et al., the disclosure of which is incorporated herein by reference. U.S. Pat. No. 5,851,353 discloses a can-drying system which is also well known in the art.

Preferred aspects of processes including fabric-creping are described in the following co-pending applications: U.S. patent application Ser. No. 11/151,761, filed Jun. 14, 2005, entitled "High Solids Fabric Crepe Process for Producing Absorbent Sheet with In-Fabric Drying"; U.S. patent application Ser. No. 11/402,609, filed Apr. 12, 2006, entitled "Multi-Ply Paper Towel With Absorbent Core"; U.S. patent application Ser. No. 11/451,112, filed Jun. 12, 2006, entitled "Fabric-Creped Sheet for Dispensers"; U.S. Provisional Patent Application Ser. No. 60/808,863, filed May 26, 2006, entitled "Fabric Creped Absorbent Sheet with Variable Local Basis Weight"; and U.S. application Ser. No. 10/679,862, filed Oct. 6, 2003, entitled "Fabric Crepe Process for Making Absorbent Sheet" which applications, incorporated herein by reference, disclose particular papermachine details as well as creping techniques, equipment and properties. U.S. application Ser. No. 11/108,375, filed Apr. 18, 2005, entitled "Fabric Crepe/Draw Process for Producing Absorbent Sheet" also incorporated herein by reference, provides still further processing and composition information; U.S. application Ser. No. 11/108,458, filed Apr. 18, 2005, entitled "Fabric Crepe and In Fabric Drying Process for Producing Absorbent Sheet" and U.S. application Ser. No. 11/104,014, filed Apr. 12, 2005, entitled "Wet-Pressed Tissue and Towel Products With Elevated CD Stretch and Low Tensile Ratios Made With a High Solids Fabric Crepe Process" both of which are incorporated herein by reference, provide some further variation as to selection of components and processing techniques. Another copending application, U.S. Ser. No. 11/451,111, filed Jun. 12, 2006, entitled "Method of Making Fabric Creped Sheet for Dispensers", incorporated herein by reference, provides information on suitable drying and other manufacturing techniques.

Figure 3:
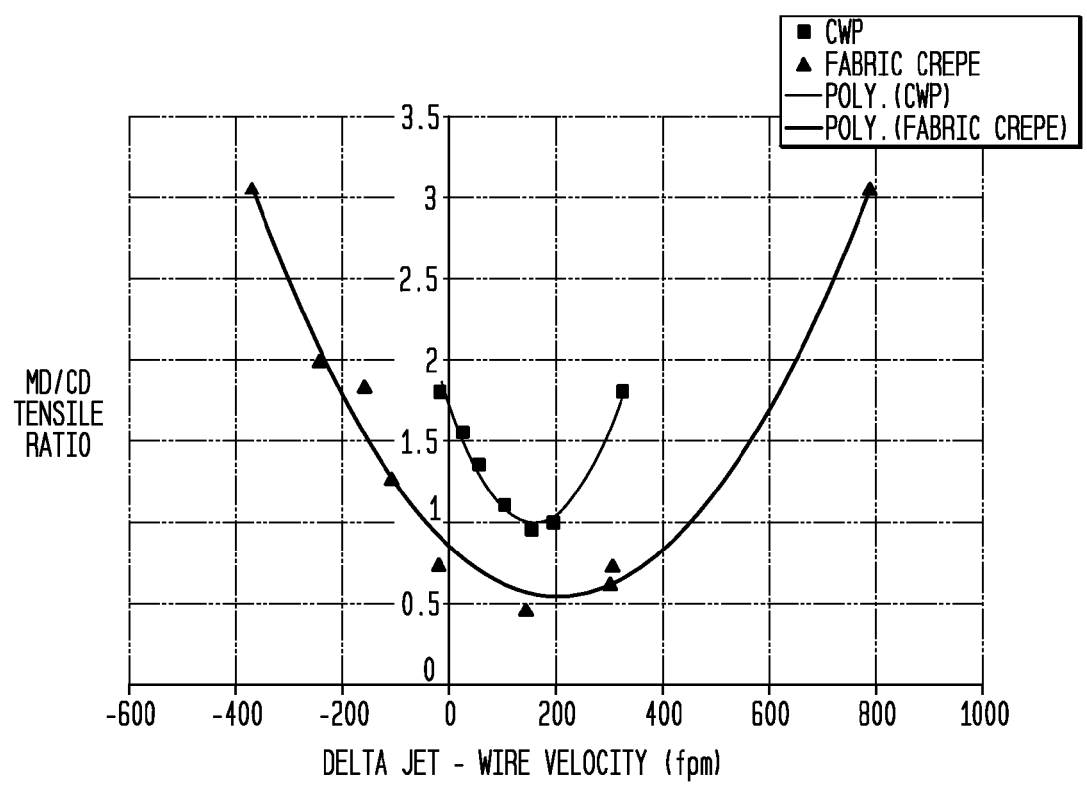
FIG. 3 is a plot of MD/CD dry tensile ratio versus jet/wire velocity delta for conventional wet-press (CWP) and wet-press, fabric crepe (FC) processes.

The above process allows one to control the MD/CD tensile ratio to a much greater extent than in CWP processes (as will be appreciated from FIG. 3 which appears in U.S. patent application Ser. No. 11/108,375) simply by varying the jet/wire velocity delta.

Using base sheet prepared on papermachines of the class shown in FIG. 8, single-ply paper towel was made and compared with towel made from base sheet prepared without debonder pre-treatment in accordance with the invention. Details appear in Table 2, wherein it is seen that the products of the invention had higher wet/dry CD tensile ratios and CD wet tensiles, as well as lower MD dry tensiles. Moreover, debonder treated products had trained panel softness values of up to 50 percent higher than equivalent products made without debonder pre-treatment.

TABLE 2

FC Single Ply Towel Converted Product Data

| Debonder | Debonder Add-on (#/T) | AMRES/ CMC | Refiner (hp) | B.W. (#/rm) | Cal. (mil/8sh) | MD (g/3") | CD (g/3") | MD/CD | CD Wet | Percent w/d | WAR(s) | Panel Softness |
|---|---|---|---|---|---|---|---|---|---|---|---|---|
| TQ-1152 | 20 | 19/5.5 | 35 | 22.88 | 71.63 | 1945 | 1421 | 1.37 | 607 | 43 | 12.2 | 6.60 |
| TQ-1152 | 20 | 19/5.5 | 42 | 22.10 | 71.35 | 2244 | 1496 | 1.50 | 626 | 42 | 14.4 | 6.10 |
| Cartaflex | 10 | 19/5.5 | 23 | 23.02 | 72.13 | 2214 | 1469 | 1.51 | 532 | 36 | 11.8 | 6.37 |
| Cartaflex | 8 | 19/5.5 | 23 | 22.98 | 66.78 | 2809 | 1973 | 1.42 | 723 | 37 | 14.8 | 4.74 |
| Control | | | | 22.65 | 66.08 | 2979 | 1876 | 1.59 | 406 | 22 | 7.1 | 4.39 |

Unexpectedly, the high levels of debonder employed did not interfere with adhesion to the transfer cylinder or the Yankee dryer or cause other processing difficulties. The invention accordingly enables wet/dry CD tensile ratios increase of up to nearly 100 percent in commercial wet-press towel operations.

It will be appreciated from the foregoing that there is provided in a first aspect of the invention a method of making absorbent cellulosic sheet with increased wet/dry CD tensile ratio comprising: a) preparing an aqueous furnish consisting essentially of cellulosic papermaking fibers in aqueous suspension having a consistency of greater than 2 percent, wherein the papermaking fiber includes Kraft softwood fiber in an amount of at least 25 percent by weight of fiber; b) treating the aqueous furnish at greater than 2 percent consistency with from about 5 lbs of debonder per ton of papermaking fiber to about 30 lbs of debonder per ton of papermaking fiber; c) typically, subsequent to the step of treating the aqueous furnish at greater than 2 percent consistency with debonder, adding a permanent wet strength resin to the aqueous furnish in an amount of from about 5 lbs of permanent wet strength per ton of papermaking fiber to about 50 lbs of permanent wet strength resin per ton of papermaking fiber; d) diluting the aqueous furnish to a consistency of less than 2 percent; e) depositing the diluted aqueous furnish onto a foraminous support traveling in a machine direction at a wire speed by way of a jet of the diluted aqueous furnish having a jet velocity in the machine direction; f) dewatering the furnish on the foraminous support to form a nascent web; g) wet-pressing the nascent web onto a rotating cylinder; and h) drying the web to produce the cellulosic sheet. The steps of dewatering, wet-pressing and drying the web as well as the jet to wire velocity delta are controlled and the furnish, debonder, dry strength resin and permanent wet strength resin are selected and utilized in amounts such that the absorbent cellulosic sheet has a wet/dry CD tensile ratio of greater than 30 percent. CD wet/dry tensile ratios are typically between about 35 percent and 60 percent; greater than 40 percent or 45 percent in suitable embodiments when CMC dry strength resin is used. MD/CD dry tensile ratios of less than 1.5 or less than about 1 are achieved in connection with CWP processes. In FC processes, MD/CD dry tensile ratios of less than 0.75 or less than 0.5 are readily achieved.

In many preferred cases, the furnish is treated with from about 10 lbs of debonder per ton of papermaking fiber to about 20 lbs of debonder per ton of papermaking fiber and the aqueous furnish is treated with debonder at a consistency of greater than 3 percent or 4 percent; typically between about 3 percent and up to about 8 to 10 percent consistency.

Dry strength resin is optionally added in an amount of from about 2.5 lbs of dry strength resin per ton of papermaking filler to about 10 lbs of dry strength resin per ton of papermaking fiber. One preferred dry strength resin is carboxymethyl cellulose.

The permanent wet strength resin is added to the furnish in an amount of from about 5 lbs per ton of papermaking fiber to about 40 lbs per ton of papermaking fiber; perhaps more preferably, the permanent wet strength resin is added to the furnish in an amount of from about 10 lbs per ton of papermaking fiber to about 30 lbs per ton of papermaking fiber.

Some processes of the invention include refining at least a portion of the papermaking fiber as well as the step of blending the debonder-treated aqueous furnish with another aqueous furnish containing papermaking fiber.

Various processes of the invention include one or more of the following features: (a) at least 50 percent by weight of the papermaking fiber in the sheet is pretreated with debonder; (b) at least 75 percent by weight of the papermaking fiber in the sheet is pretreated with debonder; (c) at least 90 percent by weight of the papermaking fiber in the sheet is pretreated with debonder; (d) the papermaking furnish comprises recycle fiber; (e) the recycle fiber comprises predominantly low yield recycle fiber as opposed to groundwood; (f) substantially all Kraft softwood fiber in the sheet is treated with debonder; (g) the rotating cylinder is a rotating heated cylinder whereupon the web is dried and the process further includes the step of creping the web form the heated cylinder with a creping doctor at reel crepe of from about 2 percent to about 25 percent; (h) the dried web is creped from the heated cylinder with a creping doctor at a reel crepe of from about 5 percent to about 20 percent; (i) the softwood pulp is treated with debonder for at least 10 minutes at a consistency of greater than 2 percent; (j) the softwood pulp is treated with debonder for at least 20 minutes at a consistency of greater than 2 percent; and (k) the softwood pulp is treated with debonder for at least 30 minutes at a consistency of greater than 2 percent.

In still another aspect of the invention, there is provided a method of making absorbent cellulosic sheet with increased wet/dry CD tensile ratio comprising: a) preparing an aqueous furnish consisting essentially of cellulosic papermaking fibers in aqueous suspension having a consistency of greater than 2 percent; b) treating the aqueous furnish at greater than 2 percent consistency, preferably greater than 5 percent consistency with from about 5 lbs of debonder per ton of papermaking fiber to about 30 lbs of debonder per ton of papermaking fiber; c) subsequent to the step of treating the aqueous furnish at greater than 2 percent consistency with debonder, adding a permanent wet strength resin to the aqueous furnish in an amount of from about 5 lbs of permanent wet strength per ton of papermaking fiber to about 50 lbs of permanent wet strength resin per ton of papermaking fiber; d) diluting the aqueous furnish to a consistency less than the consistency at which furnish was treated with debonder, preferably less than 4 or 3 percent and most preferably less than 2 or 1 percent; e) depositing the diluted aqueous furnish onto a foraminous support traveling in a machine direction at a wire speed by way of a jet of the diluted aqueous furnish having a jet velocity in the machine direction; f) compactively dewatering the furnish to form a nascent web having an apparently random distribution of papermaking fiber; g) applying the dewatered web having the apparently random fiber distribution to a translating transfer surface moving at first speed; h) belt-creping the web from the transfer surface at a consistency of from about 30 percent to about 60 percent utilizing a patterned creping belt, the creping step occurring under pressure in a belt creping nip defined between the transfer surface and the creping belt wherein the belt is traveling at a second speed slower than the speed of said transfer surface, the belt pattern, nip parameters, velocity delta and web consistency being selected such that the web is creped from the transfer surface and redistributed on the creping belt to form a web with a reticulum having a plurality of interconnected regions of different local basis weights including at least (I) a plurality of fiber-enriched pileated regions of high local basis weight, as well as (II) a plurality of regions of compressed papermaking fibers, the compressed regions having relatively low local basis weight; and i) drying the web to produce the cellulosic sheet; wherein the steps of dewatering and applying the web to the transfer surface, belt creping, wet-pressing, and drying the web as well as the jet to wire velocity delta are controlled and the furnish, debonder, and permanent wet strength resin are selected and utilized in amounts such that the absorbent cellulosic sheet has a wet/dry CD tensile ratio of greater than 30 percent.

Typically, the web is creped from the transfer surface at a Belt Crepe of between 2 percent and 80 percent; for towel used in electronic dispensers the web is creped from the transfer surface at a Belt Crepe of between 3 percent and 8 percent. In other cases, the web is creped from the transfer surface at a Belt Crepe of at least 10 percent or more such as wherein the web is creped from the transfer surface at a Belt Crepe of at least 20 percent, 30 percent, or the web is creped from the transfer surface at a Belt Crepe of at least 50 percent.

In still other aspects of the invention, mixtures of Kraft hardwood and softwood fibers are employed, such as wherein the fiber in the aqueous furnish is at least 75 percent by weight Kraft papermaking fiber; or wherein the fiber in the aqueous furnish is at least 90 percent by weight Kraft papermaking fiber; and/or wherein the papermaking fiber in the aqueous furnish is at least about 40 percent or 50 percent by weight Kraft softwood fiber. In still other embodiments, the papermaking fiber in the aqueous furnish is at least about 60 or 70 percent by weight Kraft softwood fiber.

Generally, Kraft softwood fiber employed has a length weighted average fiber length of greater than 1 mm; whereas typically, Kraft softwood fiber has a length weighted average fiber length of greater than 1.5 mm. In most cases, the Kraft softwood fiber has a length weighted average fiber length of between about 1.5 mm and about 3 mm.

While the invention has been described in connection with several examples, modifications to those examples within the spirit and scope of the invention will be readily apparent to those of skill in the art. In view of the foregoing discussion, relevant knowledge in the art and references including co-pending applications discussed above in connection with the Background and Detailed Description, the disclosures of which are all incorporated herein by reference, further description is deemed unnecessary.

What is claimed is:

1. A method of making absorbent cellulosic sheet with increased wet/dry CD tensile ratio comprising:
    a) preparing an aqueous furnish consisting essentially of cellulosic papermaking fibers in aqueous suspension having a consistency of 3 percent or more;
    b) treating the aqueous furnish at 3 percent or more consistency with from about 5 lbs of debonder per ton of papermaking fiber to about 30 lbs of debonder per ton of papermaking fiber;
    c) adding a permanent wet strength resin to the aqueous furnish in an amount of from about 5 lbs of permanent wet strength per ton of papermaking fiber to about 50 lbs of permanent wet strength resin per ton of papermaking fiber, the step of adding a permanent wet strength agent to the aqueous furnish being carried out subsequent to the step of treating the aqueous furnish with debonder;
    d) diluting the aqueous furnish to a consistency of less than the consistency at which the furnish was treated with debonder;
    e) depositing the diluted aqueous furnish onto a foraminous support traveling in a machine direction at a wire speed by way of a jet of the diluted aqueous furnish having a jet velocity in the machine direction;
    f) dewatering the furnish on the foraminous support to form a nascent web;
    g) wet-pressing the nascent web onto a rotating cylinder; and
    h) drying the web to produce the cellulosic sheet;
wherein the steps of dewatering, wet-pressing and drying the web as well as the jet to wire velocity delta are controlled and the furnish, debonder, and permanent wet strength resin are selected and utilized in amounts such that the absorbent cellulosic sheet has a wet/dry CD tensile ratio of greater than 30 percent and an MD/CD dry tensile ratio of less than 1.5.

2. The method according to claim 1, wherein the papermaking fiber includes Kraft softwood fiber in an amount of at least 25 percent by weight of fiber.

3. The method according to claim 2, wherein the steps of dewatering, wet-pressing and drying the web as well as the jet to wire velocity delta are controlled and the furnish, debonder, and permanent wet strength resin are selected and utilized in amounts such that the absorbent cellulosic sheet has a wet/dry CD tensile ratio of greater than 30 percent and an MD/CD dry tensile ratio of less than 1.

4. The method according to claim 2, wherein the aqueous furnish is treated with debonder at a consistency between about 3 and about 8 percent.

5. The method according to claim 2, further comprising adding a dry strength agent to the furnish prior to diluting the furnish.

6. A method of making absorbent cellulosic sheet with increased wet/dry CD tensile ratio comprising:
    a) preparing an aqueous furnish consisting essentially of cellulosic papermaking fibers in aqueous suspension having a consistency of 3 percent or more;
    b) treating the aqueous furnish at 3 percent or more consistency with from about 5 lbs of debonder per ton of papermaking fiber to about 30 lbs of debonder per ton of papermaking fiber;
    c) subsequent to the step of treating the aqueous furnish at 3 percent or more consistency with debonder, adding a permanent wet strength resin to the aqueous furnish in an amount of from about 5 lbs of permanent wet strength per ton of papermaking fiber to about 50 lbs of permanent wet strength resin per ton of papermaking fiber;

d) diluting the aqueous furnish to a consistency of less than the consistency at which the furnish was treated with debonder;

e) depositing the diluted aqueous furnish onto a foraminous support traveling in a machine direction at a wire speed by way of a jet of the diluted aqueous furnish having a jet velocity in the machine direction;

f) compactively dewatering the furnish to form a nascent web having an apparently random distribution of papermaking fiber;

g) applying the dewatered web having the apparently random fiber distribution to a translating transfer surface moving at first speed;

h) belt-creping the web from the transfer surface at a consistency of from about 30 percent to about 60 percent utilizing a patterned creping belt, the creping step occurring under pressure in a belt creping nip defined between the transfer surface and the creping belt wherein the belt is traveling at a second speed slower than the speed of said transfer surface, the belt pattern, nip parameters, velocity delta and web consistency being selected such that the web is creped from the transfer surface and redistributed on the creping belt to form a web with a reticulum having a plurality of interconnected regions of different local basis weights including at least (I) a plurality of fiber-enriched pileated regions of high local basis weight, as well as (II) a plurality of regions of compressed papermaking fibers, the compressed regions having relatively low local basis weight; and i) drying the web to produce the cellulosic sheet;

wherein the steps of dewatering and applying the web to the transfer surface, belt creping, wet-pressing, and drying the web as well as the jet to wire velocity delta are controlled and the furnish, debonder, and permanent wet strength resin are selected and utilized in amounts such that the absorbent cellulosic sheet has a wet/dry CD tensile ratio of greater than 30 percent and an MD/CD dry tensile ratio of less than 1.5.

7. The method according to claim 6, wherein the papermaking fiber includes Kraft softwood fiber in an amount of at least 25 percent by weight of fiber.

8. The method according to claim 7, wherein the steps of dewatering, wet-pressing and drying the web as well as the jet to wire velocity delta are controlled and the furnish, debonder, and permanent wet strength resin are selected and utilized in amounts such that the absorbent cellulosic sheet has a wet/dry CD tensile ratio of greater than 30 percent and an MD/CD dry tensile ratio of less than 1.

9. The method according to claim 7, wherein the aqueous furnish is treated with debonder at a consistency between about 3 and about 8 percent.

10. The method according to claim 7, further comprising the step of adding a dry strength agent to the furnish, which is carried out prior to diluting the furnish.

11. A method of making absorbent cellulosic sheet with increased wet/dry CD tensile ratio comprising:

a) preparing an aqueous furnish consisting essentially of cellulosic papermaking fibers in aqueous suspension having a consistency of 3 percent or more, the papermaking fiber including at least about 40 percent by weight Kraft softwood fiber;

b) treating the aqueous furnish at 3 percent or more consistency with from about 5 lbs of debonder per ton of papermaking fiber to about 30 lbs of debonder per ton of papermaking fiber;

c) subsequent to the step of treating the aqueous furnish at 3 percent or more consistency with debonder, adding a permanent wet strength resin to the aqueous furnish in an amount of from about 5 lbs of permanent wet strength per ton of papermaking fiber to about 50 lbs of permanent wet strength resin per ton of papermaking fiber;

d) thereafter diluting the aqueous furnish to a consistency of less than the consistency at which the furnish was treated with debonder and less than the consistency at which permanent wet strength resin was added;

e) depositing the diluted aqueous furnish onto a foraminous support traveling in a machine direction at a wire speed by way of a jet of the diluted aqueous furnish having a jet velocity in the machine direction;

f) dewatering the furnish to form a web; and g) drying the web to produce the cellulosic sheet;

wherein the steps of dewatering and drying the web are controlled and the furnish, debonder, and permanent wet strength resin are selected and utilized in amounts such that the absorbent cellulosic sheet has a wet/dry CD tensile ratio of greater than 30 percent and an MD/CD dry tensile ratio of less than 1.5.

12. The method according to claim 11, wherein the step of preparing the aqueous furnish comprises pulping the fiber in a pulping vessel and wherein the furnish is treated with debonder in the pulping vessel.

13. The method according to claim 11, further comprising the step of refining at least a portion of the papermaking fiber.

14. The method according to claim 11, further comprising the step of blending the debonder-treated aqueous furnish with another aqueous furnish containing papermaking fiber.

15. The method according to claim 14, wherein at least 50 percent by weight of the papermaking fiber in the sheet is pretreated with debonder.

16. The method according to claim 14, wherein at least 75 percent by weight of the papermaking fiber in the sheet is pretreated with debonder.

17. The method according to claim 14, wherein at least 90 percent by weight of the papermaking fiber in the sheet is pretreated with debonder.

18. The method according to claim 11, wherein the papermaking furnish also comprises recycle fiber.

* * * * *